Oct. 30, 1956
A. LOSLI
2,768,456
ECCENTRIC PASTURE GATE POST
Filed Sept. 24, 1954
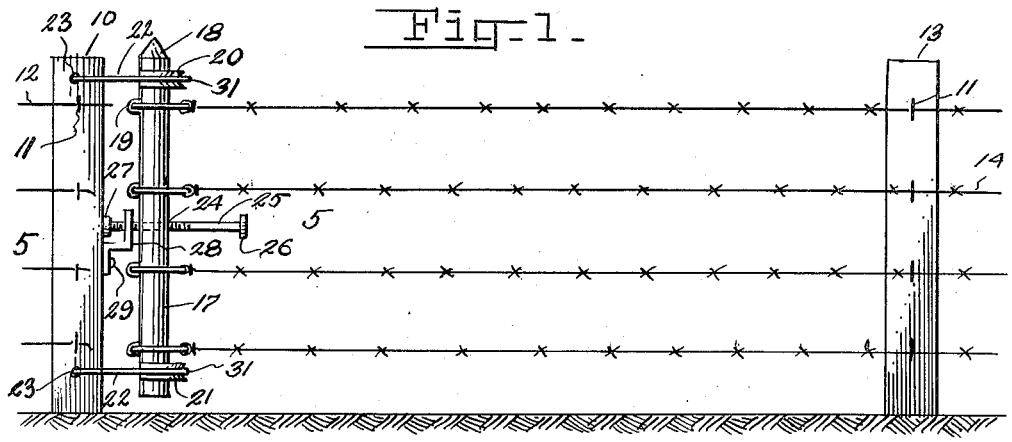
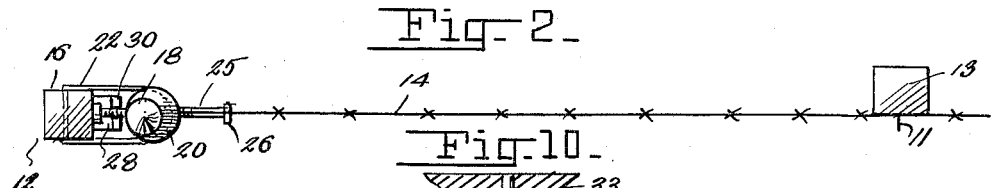
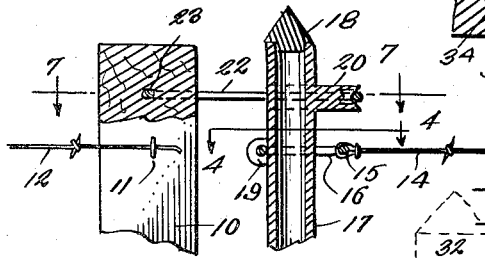
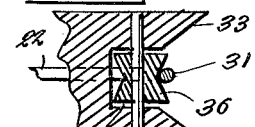
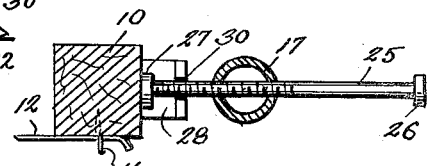
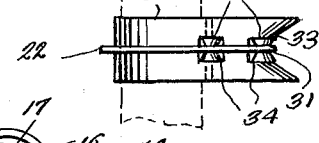
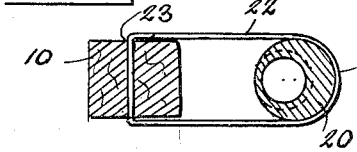
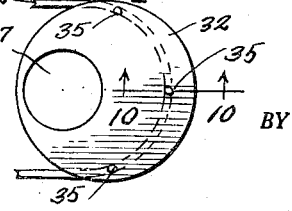
INVENTOR.
ALBERT LOSLI
BY
Patrick D. Beavers
ATTORNEY

United States Patent Office 2,768,456
Patented Oct. 30, 1956

2,768,456

ECCENTRIC PASTURE GATE POST

Albert Losli, Denver, Colo.

Application September 24, 1954, Serial No. 458,199

1 Claim. (Cl. 39—74)

This invention relates to improvements in pasture gates, and more especially to an eccentric post for the gate.

An object of this invention is to provide an eccentric gate post which by eccentric action will permit the gate to be opened or closed.

Another object of the invention is to provide a gate post which will permit the gate to be opened from either side.

A further object of the invention is to provide a gate post that can be used with a gate that comprises two or more strands of barbed wire.

With the above and other objects and advantages in view the invention consists of the novel details of construction, arrangement and combination of parts more fully hereinafter described, claimed and illustrated in the accompanying drawing:

Fig. 1 is an elevational view of a barbed wire fence assembly including a gate and the eccentric gate post embodying the invention;

Figure 2 is a top plan view of the assembly of Fig. 1;

Fig. 3 is an enlarged fragmentary detailed sectional view of the upper end of the eccentric gate post and the fence post with which it cooperates;

Fig. 4 is a transverse sectional view on the line 4—4 of Fig. 3;

Fig. 5 is an enlarged transverse sectional view on the line 5—5 of Fig. 1;

Fig. 6 is an enlarged perspective view of the handle for the gate;

Fig. 7 is a transverse sectional view on the line 7—7 of Fig. 3;

Fig. 8 is an enlarged plan view partly broken away of a modified form of eccentric;

Fig. 9 is a side elevational view of the eccentric of Fig. 8 and

Fig. 10 is a fragmentary sectional view on the line 10—10 of Figure 8.

Referring more in detail to the drawing wherein like parts are designated by like reference numerals, the reference numeral 10 is used to designate a fence post of a pasture fence.

Secured to the fence post by staples 11 or similar means are a plurality of strands of barbed wire 12. Spaced from the post 10 a distance to provide a gate opening is a similar fence post 13 to which is secured by means of staples 11 a plurality of strands of barbed wire 14. The portions of the wires 14 extending between the fence posts 10 and 13 provide a gate, and each free end of the wires 14 is provided with a loop 15 to receive a ring 16.

Receivable within the rings 16 is a tubular gate post 17 which is provided with a conical shaped cap 18. The post 17 is provided with a plurality of eyes 19 so that each ring 16 that is connected to a wire 14 is secured to the gate post 17 by an eye 19.

Adjacent the upper end of the post 17 there is fixed thereto an eccentric 20 and a similar eccentric 21 is fixed to the lower end of the post 17. Each eccentric is adapted to receive a latch 22 which is pivotally mounted in openings 23 adjacent the upper and lower ends of the post 10.

The post 17 is provided centrally thereof with a transverse opening 24 in which is threadably mounted a handle 25. The handle is an elongated threaded bolt having a hex head 26 on one end and a loosely mounted bearing portion on the opposite end. A Z-shaped catch 28 is mounted on the post 10 by a fastening means 29. The catch 28 is mounted so that it is in alinement with the handle 25 and a slot 30 in the catch 28 will receive one end of the handle 25.

In the operation of the assembly of the gate with the gate in closed position, as shown in Fig. 1, the handle 25 has been rotated so that the bearing portion 27 is in engagement with the fence post 10 and the strands of wire 14 comprising the gate are in taut condition.

When it is desired to unfasten the gate, the handle is rotated until contact is lost between the bearing portion 27 and the fence post 10. The eccentrics 20 and 21 are in engagement with the arcuate shaped portions 31 of the latches 22, and due to the eccentric action, stress is placed on the wires 14. To relieve this stress and to open the gate the handle 25 is rotated until the bearing portion 27 is out of engagement with the post 10. The post is moved upwardly until the handle is moved out of engagement with the slot 30 in the catch 28. The handle 25 is then turned either clockwise or anti-clockwise until the eccentric is out of engagement with the arcuate shaped portions 31 of the latches 22. The strands of wire 14 will become loose, the latches can be moved out of engagement with the eccentric 20 and 21, and the gate can be opened.

To close the gate the post 17 is placed in a position so that the latches 22 can be moved into the position to be again engaged with the eccentrics 20 and 21. The handle 25 is then moved either to the right or left so that the eccentrics again engage the arcuate shaped portions 31 of the latches 22. The post is moved downward until the handle 25 engages the slot 30 of the catch 28. The handle is again rotated to place stress on the wires 14 and the gate is in closed position.

In Figs. 8, 9 and 10 a modified form of eccentric is shown and includes a body portion 32 having a peripheral groove 33 to receive the arcuate portion 31 of the latch 22. A plurality of recesses 34 is provided in the body portion 32 and each recess communicates with the peripheral groove 33. A shaft 35 extends through each recess and a roller 36 is rotatably mounted on each shaft. The rollers 36 engage the arcuate portion 31 of the latch 22 and permit easier rotation of the eccentric to open or close the gate.

An eccentric opening 37 is provided in the body portion 32 for mounting the eccentric on the post 17 in the same manner as the eccentrics 20 and 21 are mounted on the post 17.

Except for the use of the collar 36 the eccentric 32 will operate in the same manner as will the eccentrics 20 and 21.

It is believed that the operation and construction of the eccentric gate post embodying the invention will be apparent to those skilled in the art, and it is to be understood that changes in the minor details of construction, arrangement and combination of parts may be resorted to without departing from the spirit of the invention or the scope of the appended claim.

Having thus described the invention what is claimed as new and desired to be secured by Letters Patent is:

A device of the character described comprising a pair of spaced fence posts, a plurality of strands of wire each affixed at one of its ends to one of said fence posts, a gate post, a plurality of rings eccentrically affixed to said gate post and each connected to the free end of one of said wires, a pair of eccentric bodies affixed to said gate post, a pair of latch members each pivotally connected to one of said fence posts and each adapted to receive one of said eccentrics therein, a catch affixed to said last-mentioned fence post and having a vertical notch in its upper end, a handle threaded diametrically through said gate post and having a loosely mounted bearing portion at one end thereof, said handle having that end portion carrying said bearing portion receivable in said notch, said eccentrics each having a peripheral groove and a plurality of recesses in communication with said groove, a shaft extending through each recess, and a roller mounted on each shaft for engagement with an associated latch.

References Cited in the file of this patent

UNITED STATES PATENTS

| | | |
|---|---|---|
| 499,279 | Bird | June 13, 1893 |
| 718,777 | Lewison | Jan. 20, 1903 |
| 1,234,286 | Chambers | July 24, 1917 |